US012621920B2

(12) United States Patent
Lancuba et al.

(10) Patent No.: US 12,621,920 B2
(45) Date of Patent: May 5, 2026

(54) PLASMA CONTROL FOR SPARK OPTICAL EMISSION SPECTROSCOPY

(71) Applicants: Thermo Fisher Scientific (Ecublens) SARL, Ecublens (CH); FEI Company, Hillsboro, OR (US)

(72) Inventors: Patrick Lancuba, Ecublens (CH); Sean Kellogg, Hillsboro, OR (US)

(73) Assignees: Thermo Fisher Scientific (Ecublens) SARL, Ecublens (CH); FEI Company, Hillsboro, OR (US)

( * ) Notice: Subject to any disclaimer, the term of this patent is extended or adjusted under 35 U.S.C. 154(b) by 100 days.

(21) Appl. No.: 18/571,695

(22) PCT Filed: May 9, 2022

(86) PCT No.: PCT/EP2022/062432
§ 371 (c)(1),
(2) Date: Dec. 18, 2023

(87) PCT Pub. No.: WO2022/263055
PCT Pub. Date: Dec. 22, 2022

(65) Prior Publication Data
US 2024/0284581 A1      Aug. 22, 2024

Related U.S. Application Data

(60) Provisional application No. 63/212,475, filed on Jun. 18, 2021.

(51) Int. Cl.
| | |
|---|---|
| *H05H 1/16* | (2006.01) |
| *G01N 21/73* | (2006.01) |
| *H05H 1/54* | (2006.01) |

(52) U.S. Cl.
CPC .............. *H05H 1/16* (2013.01); *G01N 21/73* (2013.01); *H05H 1/54* (2013.01)

(58) Field of Classification Search
CPC ...... H05H 1/04; H05H 1/0025; H05H 1/0037; H05H 1/16; H05H 1/52; H05H 1/54;
(Continued)

(56) References Cited

U.S. PATENT DOCUMENTS

| | | | |
|---|---|---|---|
| 3,501,675 A | 3/1970 | Cleaver et al. | |
| 8,552,650 B2 * | 10/2013 | Ikeda ................ | H01J 37/32192 315/111.21 |

(Continued)

FOREIGN PATENT DOCUMENTS

| | | |
|---|---|---|
| EP | 0602764 A1 | 6/1994 |
| KR | 101421446 B1 | 7/2014 |
| WO | 2010066644 A1 | 6/2010 |

OTHER PUBLICATIONS

International Search Report and Written Opinion for related Application No. PCT/EP2022/062432, dated Jun. 9, 2022, 16 pages.

*Primary Examiner* — Tung X Le

(74) *Attorney, Agent, or Firm* — Klarquist Sparkman, LLP

(57) ABSTRACT

An apparatus for plasma control is disclosed. The apparatus comprises: a plasma generator comprising two electrodes, an anode and a cathode, configured to produce a plasma between the two electrodes; a solenoid coil disposed to surround the plasma and configured to produce a magnetic field parallel to a longitudinal axis between the two electrodes; and circuitry configured for allowing independent timing of the magnetic field with respect to the production of the plasma. A method for plasma control in a spectroscopy system and an optical emission spectrometer using said method are also disclosed.

18 Claims, 9 Drawing Sheets

(58) Field of Classification Search
CPC ... G01H 21/67; G01H 21/73; H01J 37/32055;
H01J 37/32614
See application file for complete search history.

(56) References Cited

U.S. PATENT DOCUMENTS

| | | | |
|---|---|---|---|
| 9,860,968 B2 * | 1/2018 | Ikeda | F02P 23/045 |
| 10,616,989 B2 * | 4/2020 | Aoi | H05H 1/46 |
| 2007/0193518 A1 * | 8/2007 | Shiina | H05H 1/50 |
| | | | 118/723 R |
| 2015/0306411 A1 | 10/2015 | Srb et al. | |
| 2016/0200618 A1 | 7/2016 | Boughton et al. | |
| 2017/0278690 A1 * | 9/2017 | Aliman | H01J 27/08 |
| 2018/0110117 A1 * | 4/2018 | Seward | H05H 1/04 |

* cited by examiner

MULTILAYER SOLENOID

700

GENERATING A PLASMA ⟋702

CONFINING THE PLASMA AROUND A
LONGITUDINAL AXIS BY APPLYING
A MAGNETIC FIELD PARALLEL TO
SAID LONGITUDINAL AXIS ⟋704

CONTROLLING THE TIMING THE
APPLICATION OF THE MAGNETIC
FIELD SEPARATELY FROM THE TIMING
OF THE GENERATION OF THE PLASMA ⟋706

OBSERVING A SPECTRUM PRODUCED
BY THE PLASMA AT A LOCATION NEAR
OR AT THE LONGITUDINAL AXIS ⟋708

PLASMA CONTROL FOR SPARK OPTICAL EMISSION SPECTROSCOPY

CROSS REFERENCE TO RELATED APPLICATIONS

This is the U.S. National Stage of International Application No. PCT/EP2022/062432 filed May 9, 2022, which was published in English under PCT Article 21(2), which in turn claims the benefit of U.S. Provisional Application No. 63/212,475, filed Jun. 18, 2021. The provisional application is incorporated herein in its entirety.

FIELD

The present disclosure relates generally to systems, devices, and methods for plasma control, and more specifically to systems, devices, and methods for plasma control for spark optical emission spectroscopy.

BACKGROUND

Optical emission spectroscopy (OES), is a technique for the elemental analysis of samples and is particularly useful, for example, in the analysis of solid, metallic samples. The present disclosure relates to OES wherein a spark (herein used to refer to any electrical spark, arc or discharge) is used to rapidly vaporize a sample and excite elements in the vaporized sample, i.e. so-called spark OES. Light is emitted by the excited elements of the sample as transitions occur from an excited state to a lower energy state. Each element emits light of discrete wavelengths characteristic of its electronic structure, which are also termed spectral lines. By detecting the spectral lines, OES can provide a qualitative and quantitative determination of the elemental composition of the sample. A conventional spark optical emission spectrometer typically includes a spark generator for exciting the elements in the sample to emit light, an optical system for dispersing the emitted light into discrete wavelengths, a detection system for detecting the light intensity of the dispersed light and a data storage and processing system for storing and processing signals from the detection system representing the light intensity. To build up sufficient data for determination of the composition, a succession of sparks is typically employed and the resulting data generated from the sparks is accumulated for processing.

A single measurement typically comprises several tens of seconds of analysis at a spark frequency of a few hundred hertz. This is necessary for two key reasons.

The first reason is that the spark attacks different positions on the sample's surface depending on the presence of e.g. inhomogeneities or inclusions. This results in the spark not always being centered between the sample and the electrode.

The second reason is that the spark oscillates as a function of time around the central electrode. This can be caused by a combination of, among others, the supersonic expansion of the plasma, turbulences in the gas flow, physical differences in a sample's composition (e.g. different melting points), etc. . . . This is illustrated in FIG. 2, where the plasma form and position is shown. Each of the subfigures (201 to 206) corresponds to a snapshot taken at a different time.

To achieve statistically consistent and stable results, each spectroscopic measurement needs to be composed of thousands of individual sparks to compensate for these fluctuations and ensure high precision and high reproducibility. However, such strategy comes at a cost of having longer analysis times and of limiting the ability to measure low concentrations, as these will fall within statistical noise produced by the non-stable nature of the plasma. In other words, this limits the lowest concentrations that can be measured with Spark-OES technology.

There is therefore a need for controlling the form-factor and time evolution of the plasma in order to a) stabilize the plasma as a function of time; b) improve the signal-to-noise ratio and, therefore, improve the limits of detection; and c) reduce overall analysis time, which would result in operational cost savings.

BRIEF DESCRIPTION OF THE DRAWINGS

The present disclosure will now be described in more detail by way of examples and with reference to the accompanying drawings in which:

FIGS. 3*a*-3*e* illustrate the concept of "theta pinch" described in the present disclosure;

SUMMARY

Figure 1A:
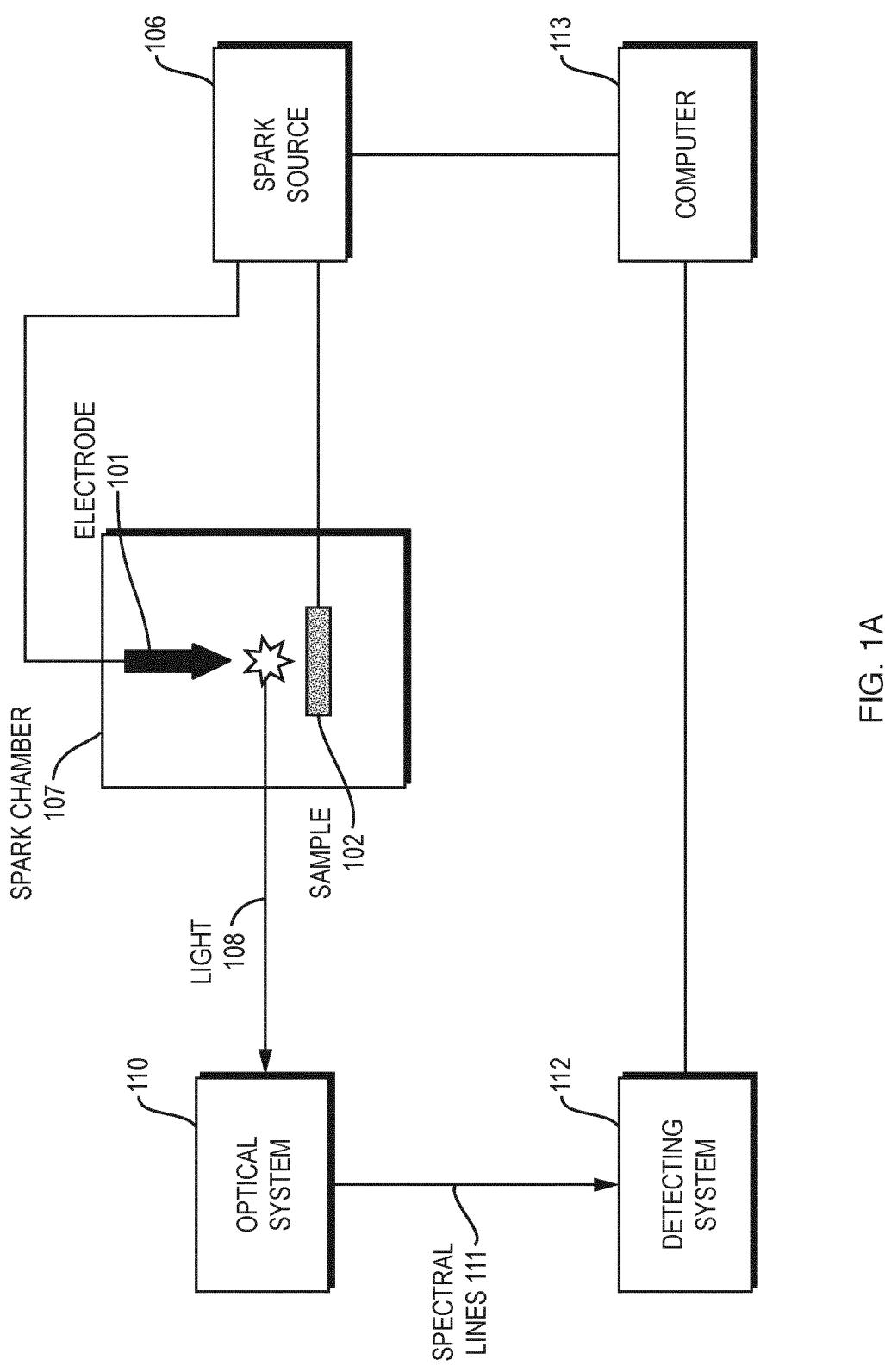
FIG. 1A is a schematic view illustrating the typical structure of an optical emission spectrometer.

According to the present disclosure, there is provided a method for plasma control in a spectroscopy system. The method comprises: generating a plasma; confining the plasma around a longitudinal axis by applying a magnetic field parallel to said longitudinal axis; controlling the timing the application of the magnetic field separately from the timing of the generation of the plasma; and observing a spectrum produced by the plasma at a location near or at the longitudinal axis.

According to another aspect of the present disclosure, there is provided an apparatus for plasma control comprising: a plasma generator comprising two electrodes, an anode and a cathode, configured to produce a plasma between the two electrodes; a solenoid coil disposed to surround the plasma and configured to produce a magnetic field parallel to a longitudinal axis between the two electrodes; and circuitry configured for allowing independent timing of the magnetic field with respect to the production of the plasma.

According to a further aspect of the present disclosure, there is provided a spectrometer comprising the apparatus for plasma control. The spectrometer may be an optical emission spectrometer and may comprise an optical system for dispersing emitted light from the plasma into discrete wavelengths; and a detection system for detecting intensity of the dispersed light. According to a still further aspect of the present disclosure, there is provided an optical emission spectrometer comprising: a plasma generator comprising an electrode, configured to produce a plasma between the electrode and a sample; a solenoid coil disposed to surround the plasma and configured to produce a magnetic field parallel to a longitudinal axis between the electrode and the sample; an optical system for dispersing emitted light from the plasma into discrete wavelengths; and a detection system for detecting intensity of the dispersed light.

In one embodiment, the magnetic field is modulated and produced by a solenoid coil, surrounding the plasma, in which a variable current is discharged. In one embodiment, the modulation spans one of a nanosecond, a microsecond, or a millisecond regime.

In one embodiment, the solenoid coil is made of a hollow metal tube in which a temperature management fluid flows. In one embodiment, the temperature management fluid actively cools the solenoid coil.

In one embodiment, the solenoid coil is one of: a single turn coil or a multi turn coil and/or a single-layer coil or a multi-layer coil. In one embodiment, the solenoid coil has a length that is greater than its turn diameter.

In one embodiment, generating the plasma and/or applying the magnetic field is performed repetitively at a frequency from 1 Hz to 1 MHz.

In one embodiment, a current used for producing the plasma is controlled by a first electronic circuit.

In one embodiment, the current used for producing the magnetic field is controlled by a second electronic circuit separate from the first electronic circuit. In one embodiment, the current used for producing the magnetic field is modulated by the second electronic circuit in a way that produces a modulated discharge comprising a combination of an exponential decay and a sinusoid.

In one embodiment, the current used for producing the magnetic field is modulated by the second electronic circuit to time it with respect to the current used for producing the plasma in such a manner that it optimizes a production of ionic and atomic spectral lines and decreases line interferences.

In one embodiment, the magnetic field production is timed in such manner that it induces an optimal tangential Larmor current on an external surface of the plasma which, combined with the magnetic field, produces a radial and inward Lorentz force that results in an optimal plasma compression.

In one embodiment, the spectrometer is one of: an Optical Emission Spectrometer (OES), such as a Spark Optical Emission Spectrometer (Spark OES) or an Inductively Coupled Plasma (ICP) OES; a plasma Mass Spectrometer (MS); a Laser Induced Breakdown Spectrometer (LIBS); and a Glow Discharge Mass Spectrometer (GDMS).

In one embodiment, the circuitry further comprises: a first electronic circuit that modulates a current used for producing the plasma; a second electronic circuit that modulates another current used for producing the magnetic field; and a logical connection between the first electronic circuit and the second electronic circuit, configured for allowing independent timing of the magnetic field with respect to the production of the plasma.

DETAILED DESCRIPTION

The following description provides embodiments of the present invention, which are generally directed to systems, devices, and methods for plasma control in spark optical emission spectroscopy. Such description is not intended to limit the scope of the present invention, but merely to provide a description of embodiments.

FIG. 1A shows schematically one embodiment of a typical optical emission spectrometer. This spectrometer is non-limiting on the scope of the invention and is for illustration only. The spectrometer is controlled by a computer 113. The computer 113 stores one or more programs for modulating the discharge of a spark source 106 with a waveform in accordance with the present invention.

The spark source 106 comprises a high current source and a low current source, each comprising components to enable the discharge (spark) current to be modulated, e.g. a current measuring means, a comparator and associated circuit switch components.

In use, a type of feedback system is therefore employed in the spark source 106 involving providing the discharge current to the comparator which is also fed with reference currents from the computer in accordance with a computer program, and switches in the circuits are actuated to either allow current flow or reduce current flow in accordance with the program to provide the modulated currents from each current source which together make up the current waveform. Each of the high and low current sources is provided with a separate reference current.

The spark source 106 is electrically connected to electrode 101 and sample 102 housed inside spark chamber 107 so that, in use, a spark is formed between them to vaporize and excite a portion of the sample 102 upon discharge of the circuit. The sample 102 is typically a metal sample and is typically in the form of a disc. In use, light 108 containing spectral lines emitted by the elements in the sample 102 upon spark excitation enters optical system 110 which disperses the light into spectral lines. The optical system 110 typically comprises a diffraction grating (not shown) for dispersing the light. Selected dispersed spectral lines 111 are then detected by means of detecting system 112 which comprises one or more photodetectors, e.g. photomultiplier tube or CCD detector. Further details of such spark optical emission spectrometer can be found in WO2010/066644 A1.

The signals from the detecting system 112, optionally after further processing, are received by the computer 113 which stores and processes them as data for ultimate output, e.g. in the form of a spectrum or other qualitative or quantitative analysis of the sample. The optical system 110 and detection system 112 are typically held under a reduced pressure (vacuum) and/or flushed with an optically inert gas to avoid interference with the spectral lines.

Figure 1B:
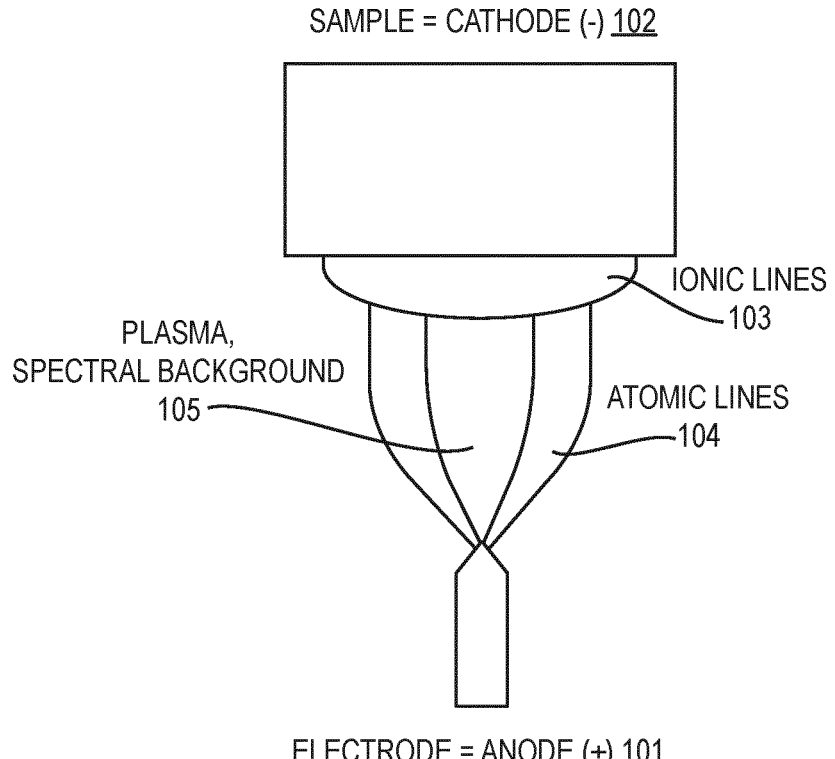
FIG. 1B is a schematic view illustrating the typical structure of a plasma between an electrode and a sample.

Referring now to FIG. 1B, there is displayed a schematic view illustrating the typical structure of a plasma between an electrode and a sample in a Spark-OES instrument. Spark-OES instruments rely on the ignition of an electric spark between an electrode (101) acting as the anode and a conducting sample (102) that needs to be analyzed, acting as the cathode, as shown in FIG. 1B. Such ignition ablates matter on the sample's surface, atomizes it, excites it and ionizes it. A plasma is therefore created, from which light emission depends on the composition of the matter ablated from the sample. This light is collected in Optical Emission Spectroscopy to perform qualitative and quantitative spectroscopy.

Typically, a spectrometer will be focused on a fixed spot diameter for light collection. The mechanical/optical setup of the instrument will be engineered such that a fixed observation point of the plasma is made to collect the light. This relatively tight observation diameter (typically 1-2 mm) is important to keep signal-to-noise ratio high enough compared to the non-emitting zones. This observation diameter allows certain line emissions to be enhanced compared to others, thus reducing line emission interferences. FIG. 1B shows ionic (103) vs. atomic (104) line zones.

A drawback of this configuration is that any physical plasma deviation from this observation spot will result in large oscillations in the collected optical emission signal. This is clearly visible in the photos of FIG. 2, where the plasma moves about the electrode as a function of time.

Referring now to FIGS. 3a-3e, there are displayed schematic representations related to the concept of Theta Pinch confinement of a plasma.

In an embodiment of the present disclosure a magnetic field is used in a Theta Pinch configuration to exert control on the plasma in Spark-OES instruments. The concept of a Theta Pinch is schematically outlined in FIGS. 3a and 3b. When a plasma (302) is surrounded by a solenoid coil (301), in which a current is discharged, a magnetic field B (309) is generated along the axis (z) of the cylinder. This field in turn induces an opposite-directed current on the surface of the plasma (Larmor current J, 310). The Larmor current in the surface layer of the plasma couples with the magnetic field B and therefore produces a Lorentz force F=J×B (311). As the Larmor current will always be tangential to the plasma, the Lorentz force will always be directed toward the center of it (see FIG. 3b). This will result in a plasma compression, or, as the name indicates, a plasma pinch. The name "Theta Pinch" comes from the fact that the current is azimuthal (in the theta direction, in cylindrical coordinates).

The concept of Theta Pinch was originally conceived for thermonuclear applications in the 1960s. Such concept is displayed in FIGS. 3c and 3d: a single-turn, cylinder-shaped solenoid coil (301) surrounds a plasma (302). A current is then discharged across the coil by applying a potential difference AU (304). This results in the formation of a Lorentz force that radially squeezes the plasma as discussed above to confine the plasma along the axis of the coil.

Nevertheless, a challenge with the thermonuclear application of the Theta Pinch was that the plasma elongated parallel across the cylinder coil, resulting in a lack of confinement along that axis (see FIG. 3d). Therefore, scientists interested in thermonuclear applications switched to a Tokamak design, which basically used the Theta Pinch original design, but curved and bent it to form a toroid to close this unconfined third dimension.

In the context of the present disclosure, this "unconfined end" issue does not apply to Spark-OES systems. A typical spark occurs between an electrode and a sample and, therefore, when a Theta Pinch is applied, it is not possible for the plasma to elongate in an unconfined manner along the axis of the solenoid coil. The plasma is trapped axially and the pinch is successful in radially compressing it.

The goal of using this novel Theta Pinch architecture for Spark-OES is to exert a compressive force on the plasma, thus increasing its temperature and density, while simultaneously keeping the form factor under control as a function of time.

This control will result in A) stronger line emissions, because of increased sample vaporization and atomization efficiency in the hotter core of the unidirectional plasma; B) reduced line interferences, as the higher temperatures and densities will result in earlier and more rapid line emission and therefore in a better time-separation between ionic and atomic line emissions; and C) lower background noise, resulting from the greater localization of the continuum background radiation in the region near the plasma axis.

These characteristics result in an enhanced signal-to-noise ratio and in a greater stability of the plasma as a whole.

Better quantification limits with shorter analysis time are therefore key benefits of the Theta Pinch system proposed here.

Figure 4:
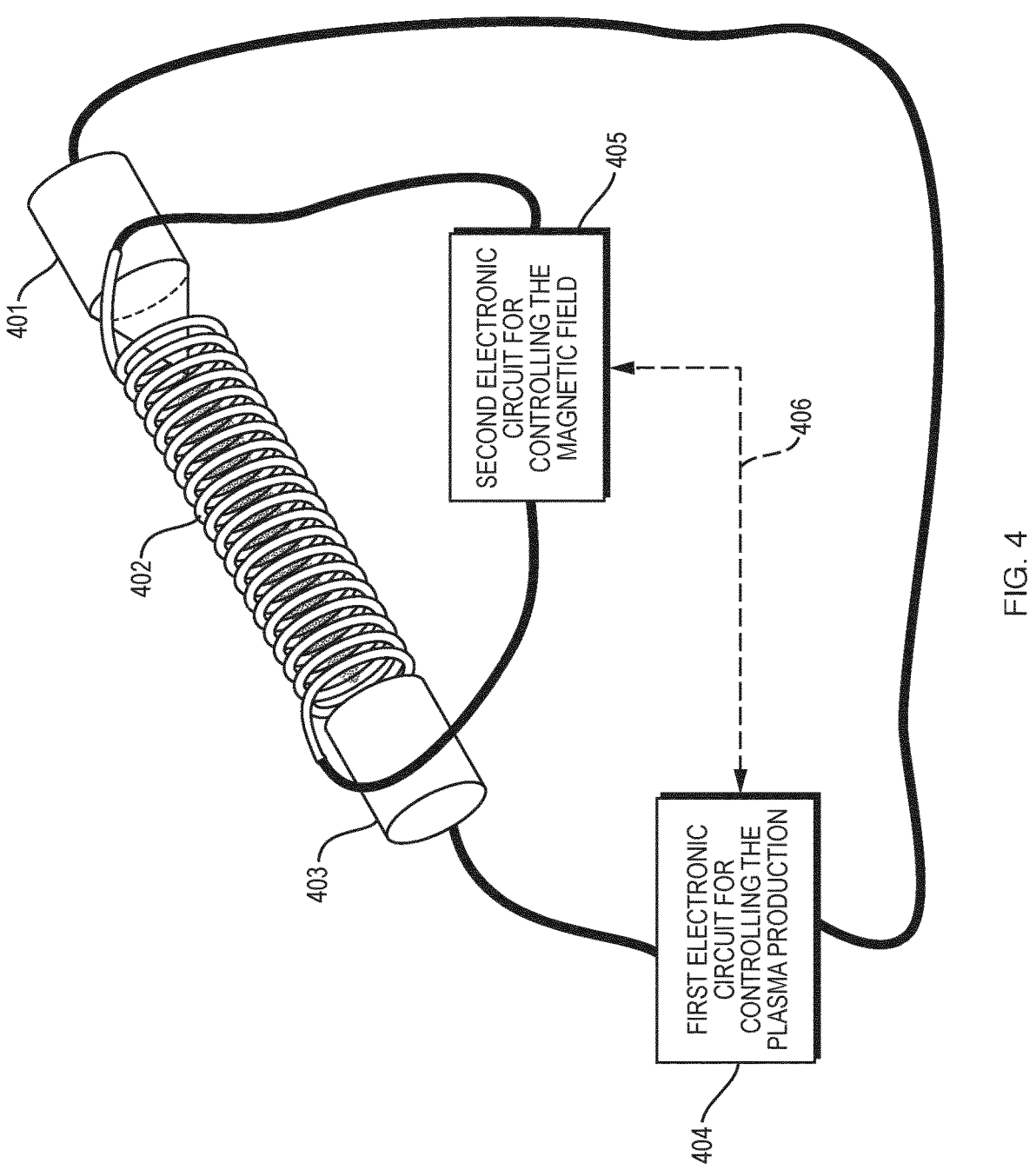
FIG. 4 illustrates a plasma control apparatus according to an embodiment of the present disclosure.

A practical embodiment of this disclosure is displayed schematically in FIG. 4.

A plasma is created by ignition by passing a current between an electrode (401) and the sample to be analyzed (403). The electrode (401) and the sample (403) are separated by a gap. Typically, the electrode (401) functions as the anode and the sample (403) functions as the cathode.

A solenoid coil (402) radially surrounds the plasma along at least a portion of its length along the axis between the electrode and the sample. In some embodiments, the solenoid coil surrounds the plasma along more than half of the length between the electrode and sample. In some embodiments, the solenoid coil surrounds the plasma along more than 60%, or 70%, or 80%, or 90% of the length between the electrode and sample. Typically, the solenoid coil surrounds the plasma along 100% of the length between the electrode and sample. In addition, in some embodiments, the solenoid coil surrounds at least part, or all, of the electrode and sample.

By letting a current be discharged in the coil as explained in the previous sections, a Theta Pinch is generated and it radially compresses the plasma, as discussed in the previous sections.

Figure 5A:
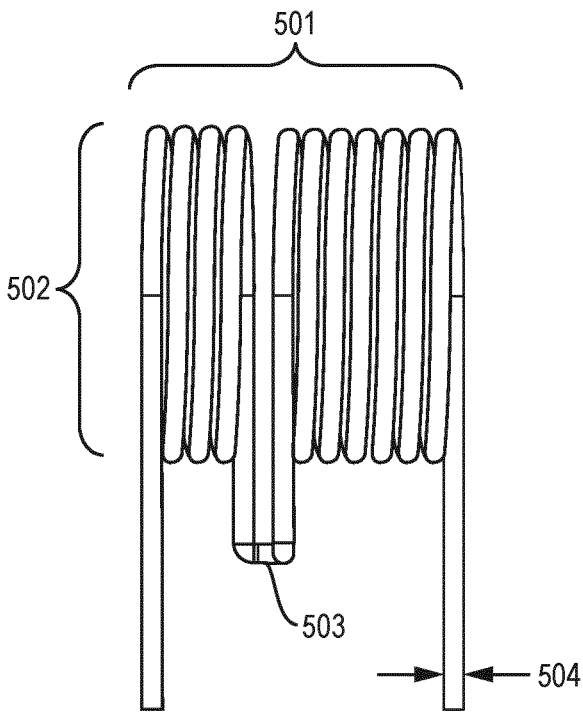
FIGS. 5A-5B illustrate examples of solenoid coils according to embodiments of the present disclosure.
Figure 5B:
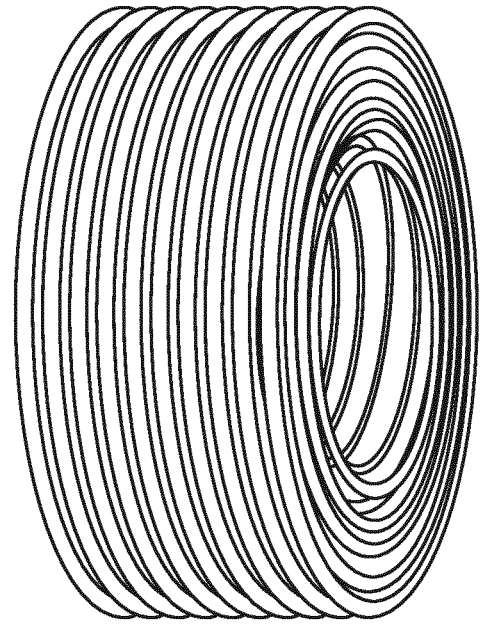

This solenoid coil can be single-turned or multi-turned and configured in a single layer (as shown in FIG. 4 and FIG. 5A) or in several layers (as shown in FIG. 5B). In some embodiments, this solenoid coil may comprise 10 to 30 turns arranged in 2 or 3 layers. It can be formed by either a solid conductor (such as copper, copper alloy, silver alloy or other metals and alloys) or by a hollow conductor allowing a cooling fluid (such as water, for example) to flow through it and to keep the temperature of the coil under control. The hollow conductor can be formed from the same conductor materials as described for the solid conductor.

Figure 2:
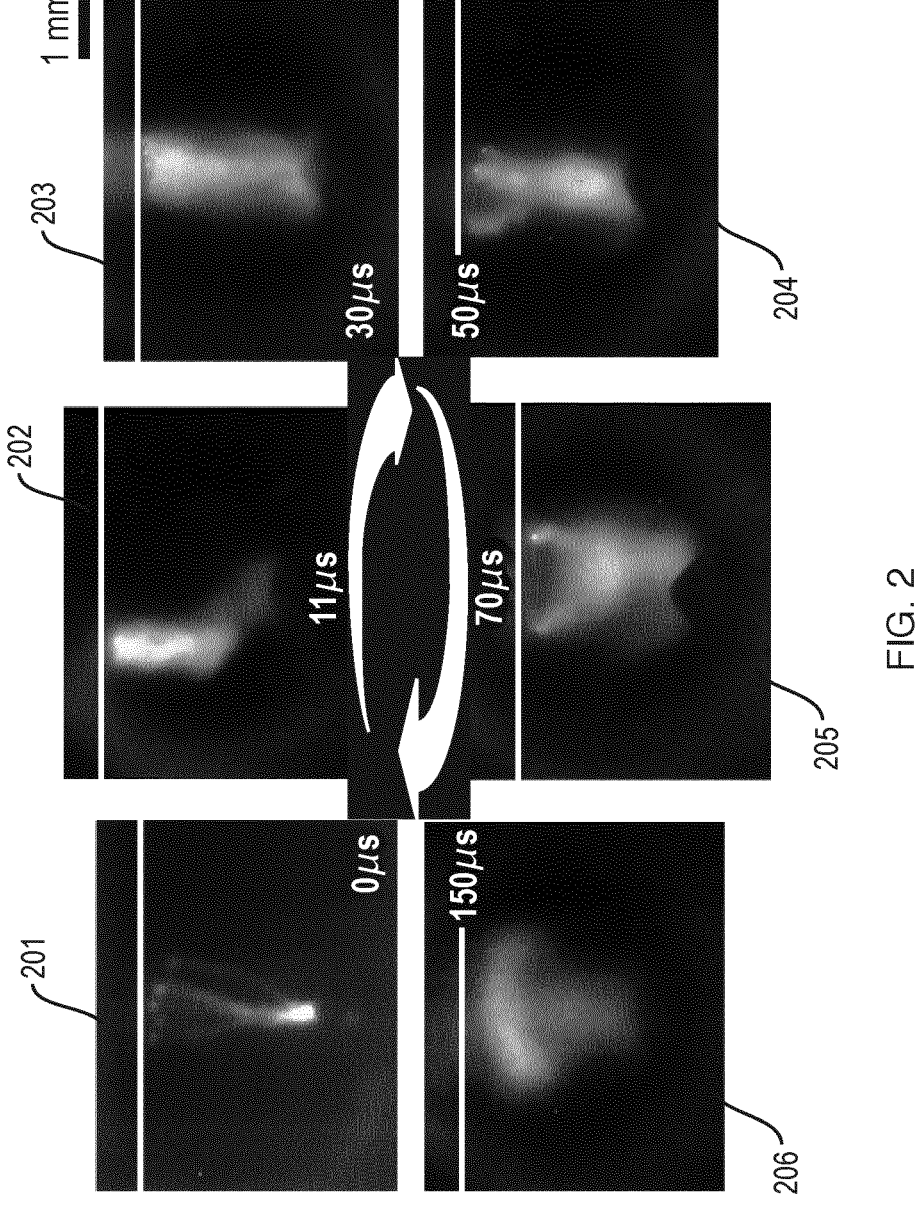
FIG. 2 shows a series of photographs of a plasma taken at different times.
Figure 3E:
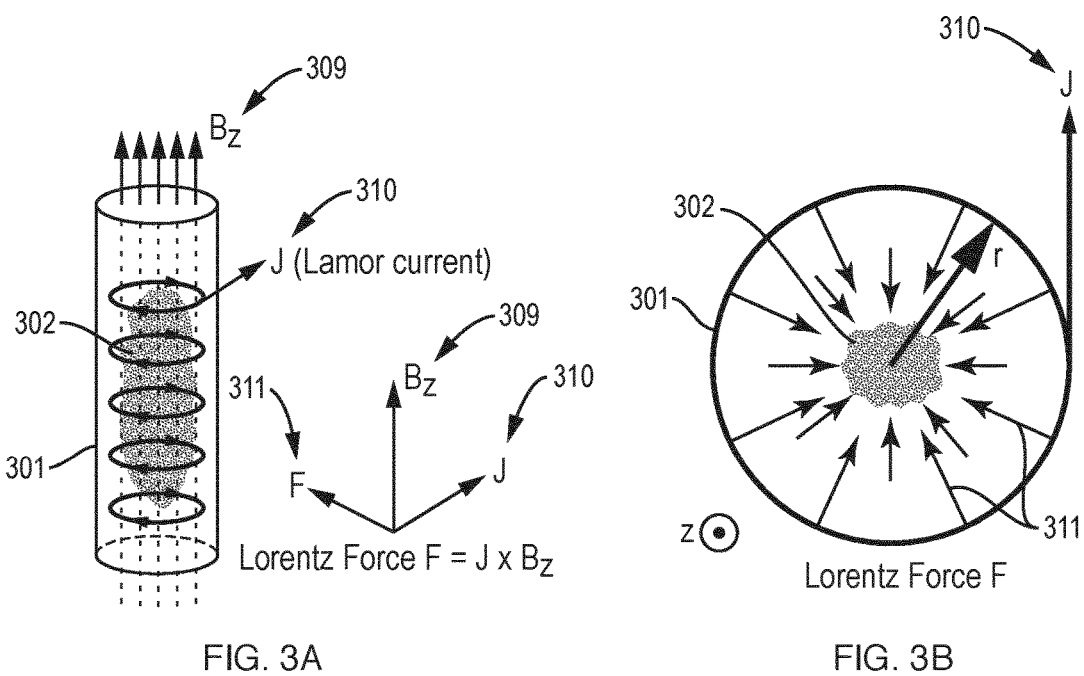
Figure 3E:
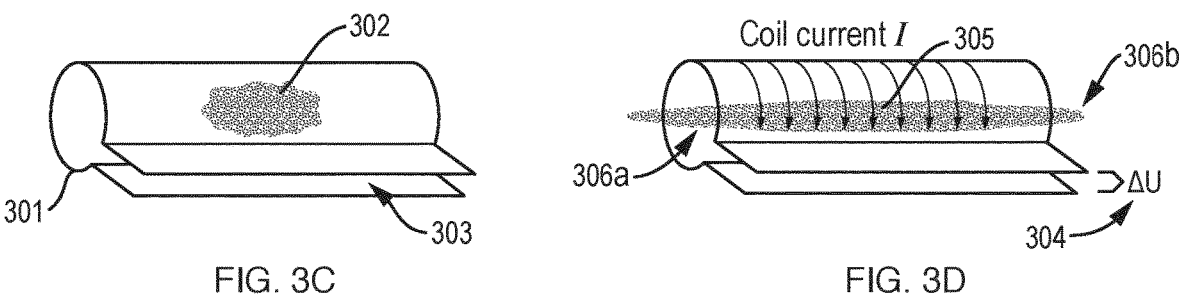
Figure 3E:
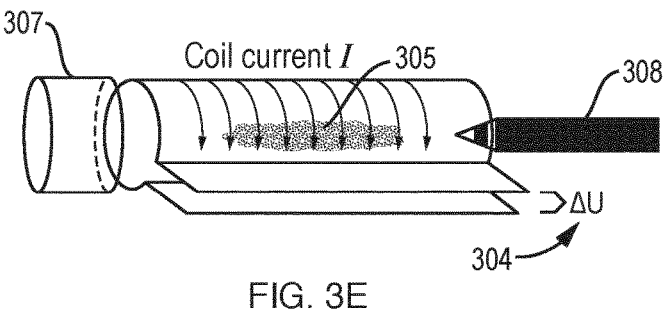

As shown in FIG. 4, the current used to produce the plasma is controlled by a first electronic circuit (404), and the current used for the solenoid coil to produce the magnetic field is controlled by a second, separate electronic circuit (405). These two electronic circuits may be connected (406) to each other, either analogically or digitally, connected to a common computer, or completely separate. This allows the current used for producing the magnetic field to be modulated and timed with respect to the current used for producing the plasma in such a manner that it optimizes a production of ionic and atomic spectral lines and decreases line interferences and provides cleaner spectra. The timing of applying the magnetic field is thus controlled separately from timing of generating the plasma. A delay is typically applied between the two. The current used to produce the plasma is started before the current used to produce the magnetic field. In this way, the plasma is generated in a first step and the magnetic field is generated in a second step, started after the first step, to confine the expanding plasma in the second step. The delay between starting the plasma and starting the magnetic field can be between 0 and 50 microseconds, for example 5 to 50 microseconds, or 10 to 50 microseconds, or 20 to 40 microseconds, typically around 30 microseconds. The duration of the plasma pinching may be at least 100 microseconds, or at least 150 microseconds long. The duration of the plasma pinching may be up to 500 microseconds, or 300 microseconds, or 200 microseconds long. The duration of the plasma pinching may be 100-500 microseconds, or 100-300 microseconds, or 100-200 microseconds. As shown in FIG. 2, photograph (203), this delay allows the plasma to expand from a filament to a column shape such that the magnetic field can actually exert a significant Lorentz force and therefore an effective Theta Pinch that will keep the plasma as it is shown at (203). In this way, the plasma can begin to be pinched by the magnetic field after an initial expansion has occurred but before the plasma expansion becomes too large in order to optimize stability and S/N of a detected signal. The magnetic field generation step can be decoupled from the plasma generation step. Generating respective currents for the spark discharge and the solenoid coil in this way enables the current magnitudes, timings, and modulations to be independently controlled. In some embodiments, the timing and strength of the magnetic field can be controlled by feedback from one or more detected spectral lines to adjust the magnetic field and optimize the signal-to-noise of the spectral lines. Thus, methods or apparatus, for example based on artificial intelligence, may take a signal from one or more detected spectral lines and optimize one or more selected coil current parameters, such as the time decay, time delay, pulse duration, etc. The foregoing discussion about starting the magnetic field relates to the timing of the field itself. It will be appreciated by those skilled in the art that the electronic discharge circuit which powers the magnetic field may have its own ramp-up time and, as such, may need to be started several tens of microseconds before the peak field is desired.

The solenoid design can be engineered to allow the plasma light to be collected by a spectrograph. This can be understood with the help of FIG. 5A, which displays a solenoid coil according to an embodiment of the present disclosure.

In FIG. 5A, a solenoid coil with length (501) and a turn diameter (502) is displayed. The wire thickness is given by (504). A typical length (501) is 4-5 cm, a typical diameter (502) is 2-3 cm and a typical thickness (504) is 1.5-2 mm (e.g. 1.8 mm). A typical number of turns is 5-30, 5-20 (e.g. 10-30, 5-15, or 8-15, or 10-12). An aperture (503) has been introduced in between the windings of the solenoid coil. A typical aperture (503) in between the coil is of the order of 1-3 mm (e.g. 1.5 mm or 2 mm). Through this aperture, the light emitted by the plasma can be collected by a suitable optical system of a spectrometer and detected to provide for chemical analysis of the sample.

In an embodiment, the solenoid coil preferably has a length (501) that is greater than its diameter (502), for example at least 1.5× greater, or at least 2× greater. This geometry is well suited to the use in real spark-OES systems. Prior art geometries cannot directly be applied, as they are too big, heat up too fast unless one uses thick copper wire, and they do not provide the correct pinching times.

The plasma sparks are typically provided as a series of pulses, for example with a pulse frequency of 10-1000 Hz, or 100-800 Hz, or 300-600 Hz (such as 500 Hz). The plasma generation time is determined by the current discharge period, which is typically in the range of 1-1000 microseconds, or 1-100 microseconds. This allows for efficient ablation of the surface and excitation of the ablated material to produce ionic and atomic spectral lines. The Theta pinch can be applied to a pulsed plasma system by repeated pinching, for example by applying Theta pinches with the same frequency as the plasma generation. The Theta pinch repetition may range from 1 Hz to 1 MHz. The Theta pinch repetition may be 10 Hz-10 kHz, or 10-1000 Hz, or 100-800 Hz, or 300-600 Hz (such as 500 Hz) for a spark plasma system. An advantage of this solution is that it results in a minimal disruption of the magnetic field within the coil, which in turn also minimizes inhomogeneities in the Lorentz force exerted by the Theta Pinch.

The Theta Pinch depends on two components: the strength of the magnetic field (B) combined with the velocity (v) of the ions on one side, and the strength of the electric field (E) on the other side:

$$F = qE + qv \times B$$

where q is the charge of the ions.

The term qE is typically negligible compared to the magnetic field contributions.

Figure 6:
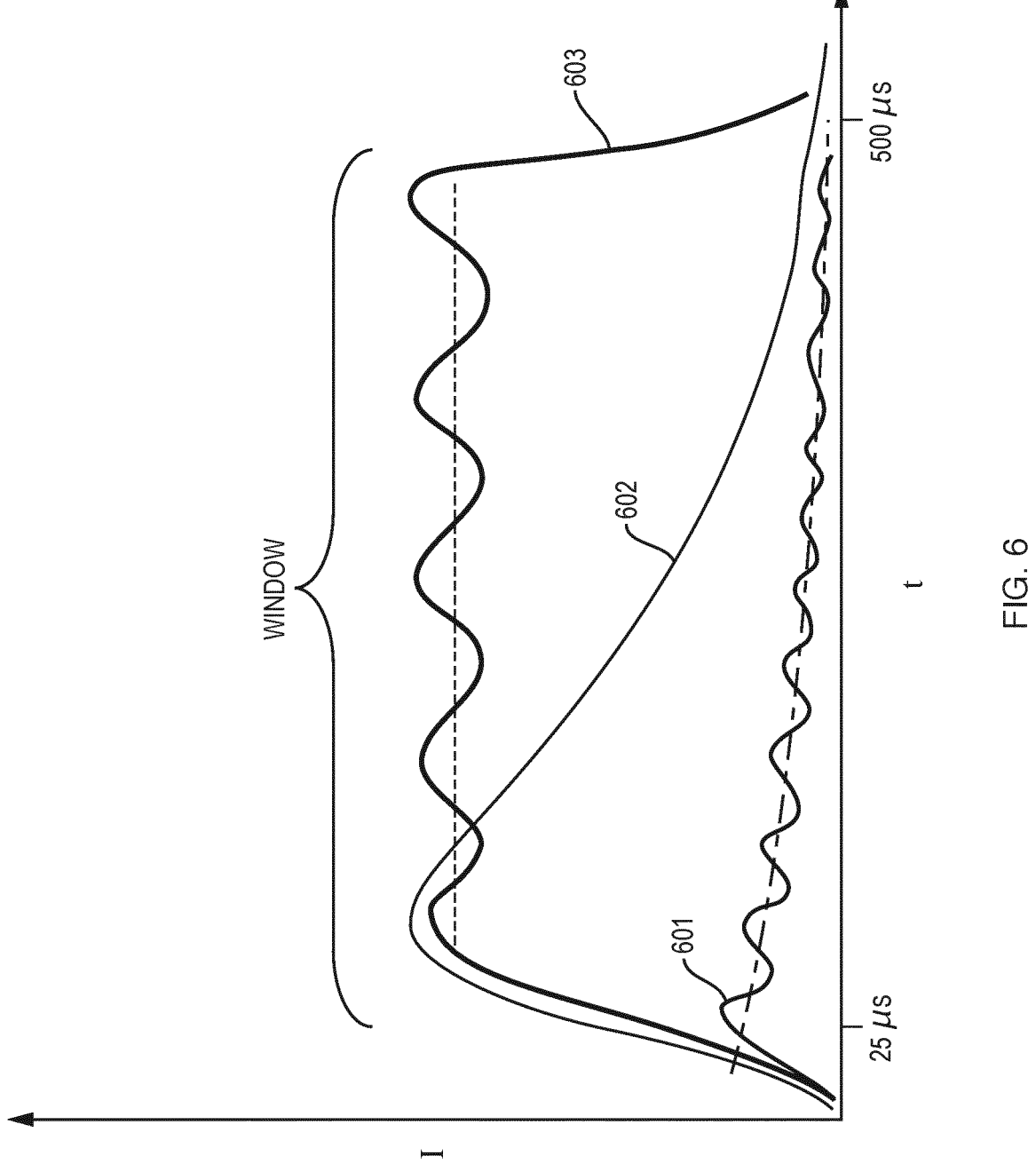
FIG. 6 is a graphical representation of several types of current discharge as a function of time.

Referring now to FIG. 6, there is displayed a graphical representation of several types of current discharge as a function of time.

Curve 602 represents a non-modulated discharge with exponential decay. The strength of the magnetic field depends on the current discharged through the solenoid. This means that a high current discharge corresponds to a rapidly rising magnetic field, which in turn corresponds to an increasingly strong pinching. The pinching vanishes with the exponential decay of the current, leading to a re-expansion of the plasma. So, this pinching is time-limited in its effectiveness. In the Lorentz force equation, the magnetic field B is maximized, without azimuthally accelerating ions. The speed of the ions depends merely on the radius, i.e. their position on an "orbit" around the plasma. So, external ions will have a higher linear velocity and will be pinched more effectively.

Curve 603 represents a modulated, constant current. Two things need to be noted here: first, a constant high current results in a constant, strong magnetic field. This results in a strong pinching, like in 602. However, unlike in 602, this strength lasts for as long as the current is kept going. Secondly, by adding a current modulation, a Back Electromotive Force (Back-EMF) is also induced. This can be understood in terms of the Maxwell equations (Lenz' law):

$$\nabla \times E = -\frac{\partial B}{\partial t}$$

By varying the intensity of the discharged current (and therefore the field B) as a function of time, an electric field gradient is also enabled. This creates an azimuthal current around the plasma, which accelerates the charges (ions) "orbiting" the plasma, which in turn strengthens the term qv in the Lorentz force's equation. For this option 603 one can expect very strong and constant pinching, without any re-expansion as in the case of 602. However, if the absolute current is very high for a long period of time, then this will lead to very strong heating of the solenoid due to the Joule effect. Depending on the strength of the current, this could rapidly lead to an unmanageable situation in terms of keeping the solenoid's temperature under control.

Curve 601 represents a modulated, low current scenario. The goal of this method is to solve the main issue of case 603. That is, to keep the temperature of the solenoid under control, but still have a significant pinching to control the plasma for as long as needed. To achieve this, we take advantage of Lenz' law. Like in 603, by varying the intensity of the discharged current, we accelerate ions to strengthen the term qv, which in turn also strengthens the overall Lorentz force. However, unlike in 603, we avoid the high temperature problem by keeping the current to relatively low absolute values and thus avoiding a strong Joule effect. In terms of pinching, we compensate for the relative weakness of the B-field with the acceleration of ions around the plasma. This option does not result in a pinching as strong as in 603, but because of the low consumption of current, this results in an effective pinching for long periods of time without a runaway Joule effect. The peak discharge current of the circuit for generating the magnetic field in 601 may lie in the range 100-500 A, for example 200 A. The charging voltage of the circuit for generating the magnetic field in 601 may lie in the range of 50-1000 V, for example 150 V. The discharge current and charging voltage depend strongly on the particular details of the solenoid coil, and persons skilled in the art will appreciate that various solenoid coil configurations may be used. This option also has the advantage of requiring simpler, less expensive electronics. The modulation of the current for generating the magnetic field comprises amplitude modulation, e.g. an oscillation on a decaying current. The modulation may be sinusoid. The decaying current may be an exponential decaying current. The modulation can be in the nanosecond or microsecond, or millisecond regime. Typically, the frequency of modulation of the current generating the magnetic field can be from 1 kHz to 100 MHz. In a preferred embodiment, the frequency of modulation of the current generating the magnetic field will be from 1 MHz to 100 MHz.

Figure 7:
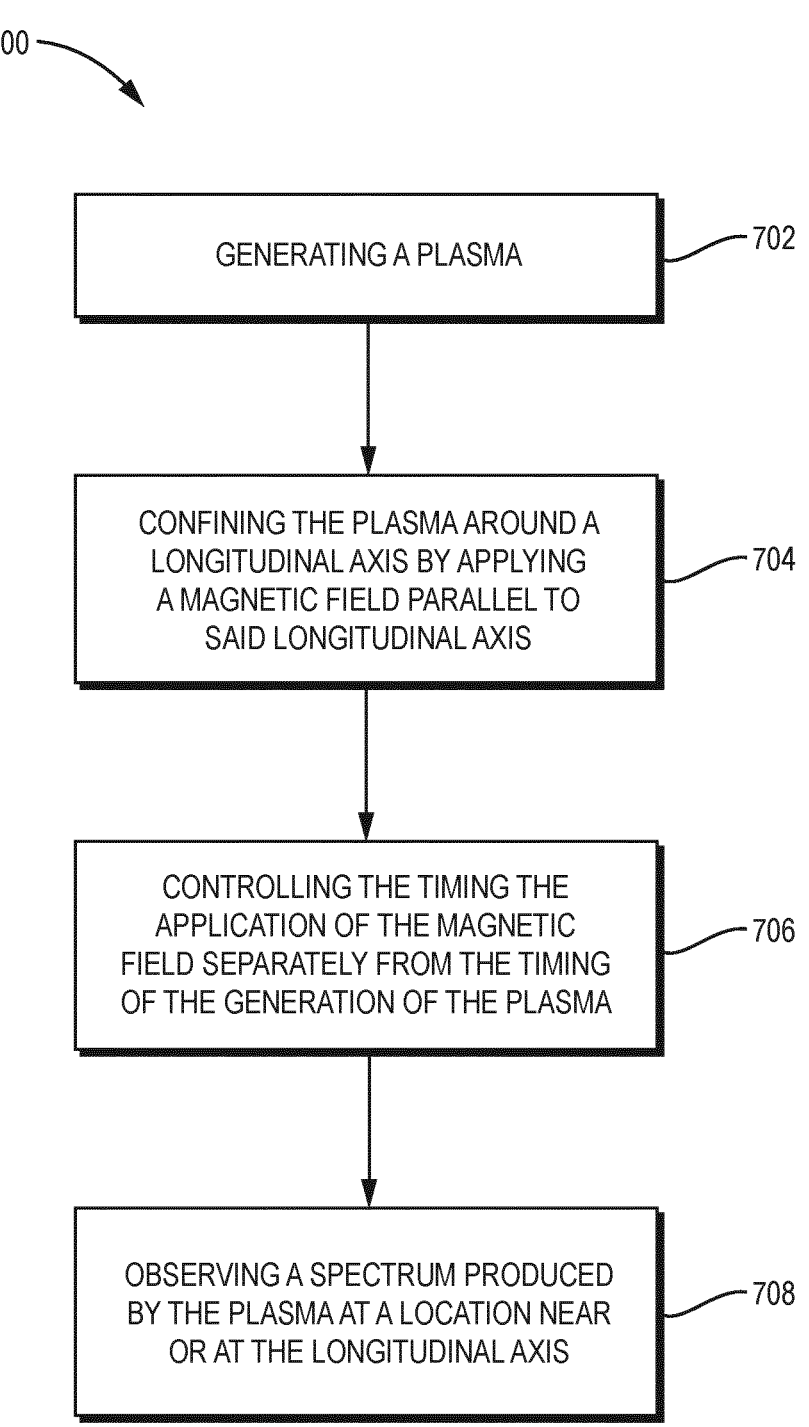
FIG. 7 illustrates a method for plasma control in a spectroscopy system according to an embodiment of the present disclosure.

As illustrated in FIG. 7, the present disclosure provides a method (700) for plasma control in a spectroscopy system. The method comprises: generating (702) a plasma; confining (704) the plasma around a longitudinal axis by applying a magnetic field parallel to said longitudinal axis; controlling (706) the timing the application of the magnetic field separately from the timing of the generation of the plasma; and observing (708) a spectrum produced by the plasma at a location near or at the longitudinal axis.

Figure 8:
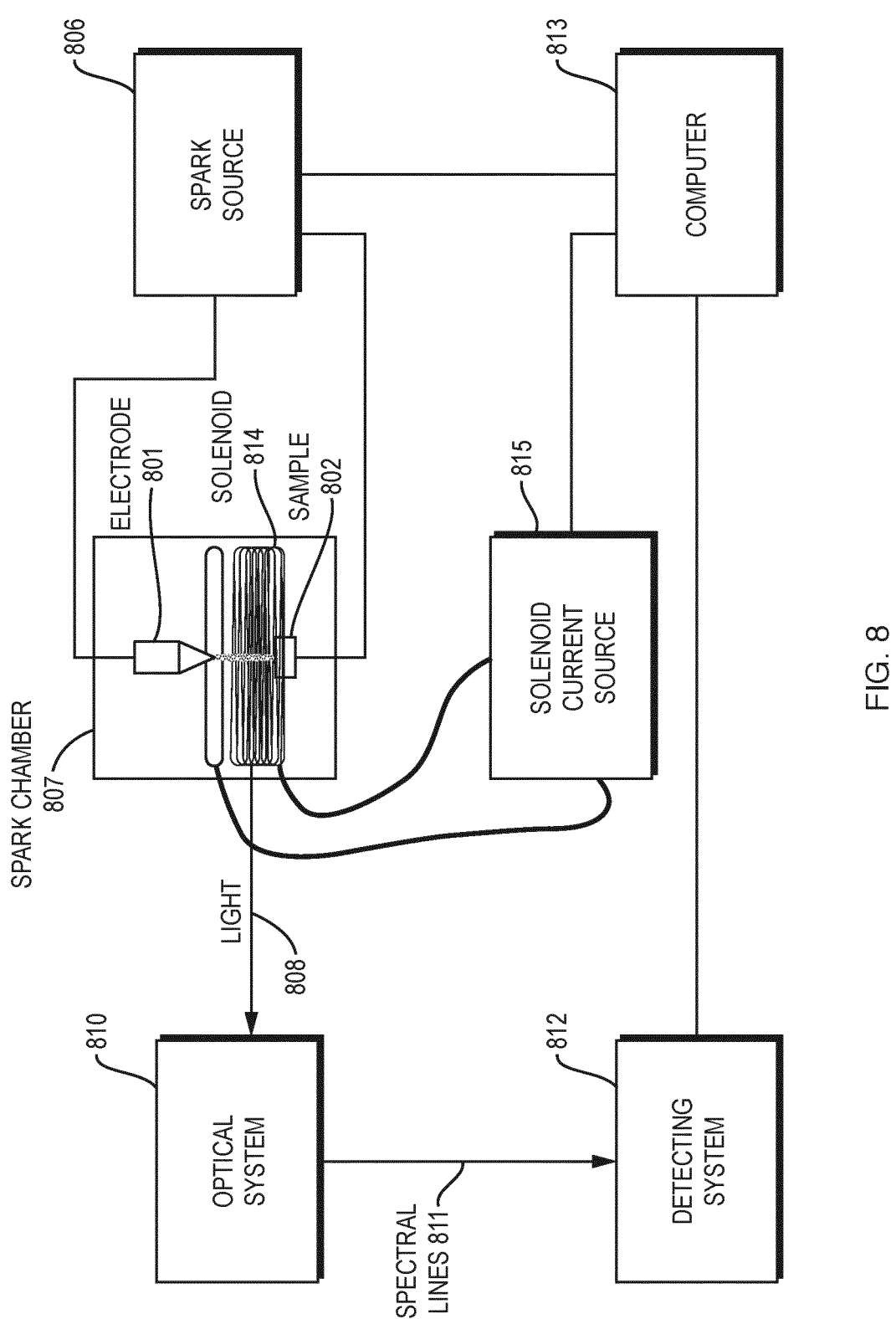
FIG. 8 is a schematic view illustrating the structure of an optical emission spectrometer according to an embodiment of the present disclosure.

As illustrated in FIG. 8, the present disclosure also provides an optical emission spectrometer comprising: a plasma generator comprising an electrode 801, configured to produce a plasma from a spark between the electrode 801 and a sample 802; a solenoid coil 814 disposed to surround the electrode and the sample, configured to produce a magnetic field parallel to a longitudinal axis between the electrode and the sample; an optical system 810 for dispersing emitted light from the plasma into discrete wavelengths; and a detection system 812 for detecting intensity of the dispersed light.

Typically, the spectrometer further comprises a data storage and processing system 813 for storing and processing signals from the detection system representing the light intensity. To build up sufficient data for determination of the composition, a succession of sparks is typically employed and the resulting data generated from the sparks is accumulated for processing.

The system described in this disclosure makes reference to a Spark Optical Emission Spectroscopy (Spark-OES) system, but the same principle could be applied to a system with a different plasma source and/or analyzer such as, for example: an Inductively Coupled Plasma (ICP) Optical Emission Spectrometer; a plasma Mass Spectrometer (MS); a Laser Induced Breakdown Spectrometer (LIBS); or a Glow Discharge Mass Spectrometer (GDMS).

While the foregoing disclosure discusses illustrative aspects and/or embodiments, it should be noted that various changes and modifications could be made herein without departing from the scope of the described aspects and/or embodiments as defined by the appended claims. Further-more, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for plasma control in a spectroscopy system, the method comprising:
   generating a plasma;
   confining the plasma around a longitudinal axis by applying a magnetic field parallel to said longitudinal axis, wherein timing of applying the magnetic field is controlled separately from timing of generating the plasma; and
   observing a spectrum produced by the plasma at a location near or at the longitudinal axis.

2. The method of claim 1, wherein the magnetic field is modulated and produced by a solenoid coil, surrounding the plasma, in which a variable current is discharged.

3. The method of claim 2, wherein the modulation spans one of a nanosecond, a microsecond, or a millisecond regime.

4. The method of claim 2, wherein the solenoid coil is made of a hollow metal tube in which a temperature management fluid flows.

5. The method of claim 4, wherein the temperature management fluid actively cools the solenoid coil.

6. The method of claim 2, wherein the solenoid coil is one of: a single turn coil or a multi turn coil and/or a single-layer coil or a multi-layer coil.

7. The method of claim 2, wherein the solenoid coil has a length that is greater than its turn diameter.

8. The method of claim 2, wherein a current used for producing the plasma is controlled by a first electronic circuit.

9. The method of claim 8, wherein the current used for producing the magnetic field is controlled by a second electronic circuit separate from the first electronic circuit.

10. The method of claim 9, wherein the current used for producing the magnetic field is modulated by the second electronic circuit in a way that produces a modulated discharge comprising a combination of an exponential decay and a sinusoid.

11. The method of claim 10, wherein the current used for producing the magnetic field is modulated by the second electronic circuit to time it with respect to the current used for producing the plasma in such a manner that it optimizes a production of ionic and atomic spectral lines and decreases line interferences.

12. The method of claim 1, wherein generating the plasma and/or applying the magnetic field is performed repetitively at a frequency from 1 Hz to 1 MHz.

13. The method of claim 1, wherein the spectroscopy system is one of:
   a Spark Optical Emission Spectrometer (OES);
   an Inductively Coupled Plasma (ICP) OES;
   a plasma Mass Spectrometer (MS);
   a Laser Induced Breakdown Spectrometer (LIBS); and
   a Glow Discharge Mass Spectrometer (GDMS).

14. An apparatus for plasma control comprising:
   a plasma generator comprising two electrodes, including an anode and a cathode, configured to produce a plasma between the two electrodes;

11 a solenoid coil disposed to surround the plasma and configured to produce a magnetic field parallel to a longitudinal axis between the two electrodes; and circuitry configured for allowing independent timing of the magnetic field with respect to the production of the plasma.

15. The apparatus of claim 14, wherein the magnetic field production is timed in such manner that it induces an optimal tangential Larmor current on an external surface of the plasma which, combined with the magnetic field, produces a radial and inward Lorentz force that results in an optimal plasma compression.

16. The apparatus of claim 14, the circuitry further comprising:

a first electronic circuit that modulates a current used for producing the plasma;

a second electronic circuit that modulates another current used for producing the magnetic field; and

12 a logical connection between the first electronic circuit and the second electronic circuit, configured for allowing independent timing of the magnetic field with respect to the production of the plasma.

17. A spectrometer comprising the apparatus of claim 14.

18. An optical emission spectrometer comprising:

a plasma generator comprising an electrode, configured to produce a plasma between the electrode and a sample;

a solenoid coil disposed to surround the plasma and configured to produce a magnetic field parallel to a longitudinal axis between the electrode and the sample;

circuitry configured for allowing independent timing of the magnetic field with respect to production of the plasma;

an optical system for dispersing emitted light from the plasma into discrete wavelengths; and a detection system for detecting intensity of the dispersed emitted light.

* * * * *